United States Patent
Chen et al.

(10) Patent No.: US 6,712,939 B2
(45) Date of Patent: Mar. 30, 2004

(54) PROCESS FOR MANUFACTURING WET-FELTED AND THERMALLY BONDED POROUS STRUCTURES AND POROUS STRUCTURES FORMED BY THE PROCESS

(75) Inventors: Wei-Chih Chen, Duluth, GA (US); Katharine L. K. Faye, Moodus, CT (US); Mark Schimmel, Stafford Springs, CT (US)

(73) Assignee: Cuno Incorporated, Meriden, CT (US)

( * ) Notice: Subject to any disclaimer, the term of this patent is extended or adjusted under 35 U.S.C. 154(b) by 192 days.

(21) Appl. No.: 09/793,174

(22) Filed: Feb. 26, 2001

(65) Prior Publication Data

US 2002/0119299 A1 Aug. 29, 2002

(51) Int. Cl.⁷ .......................... D21F 11/00; D21F 13/00
(52) U.S. Cl. .................. 162/218; 162/228; 162/207; 428/287; 428/288; 264/113; 264/122; 210/496; 210/503; 210/490; 210/489
(58) Field of Search ................ 162/218, 228, 162/207; 428/287, 288; 264/113, 122, 126; 210/496, 503, 490, 489

(56) References Cited

U.S. PATENT DOCUMENTS

| | | |
|---|---|---|
| 4,032,457 A | 6/1977 | Matchett ..................... 210/489 |
| 4,243,480 A | 1/1981 | Hernandez et al. |
| 4,305,782 A | 12/1981 | Ostreicher et al. |
| 4,389,224 A | 6/1983 | Sicard ........................... 55/55 |
| 4,620,932 A | 11/1986 | Howery ...................... 210/808 |
| 4,859,386 A | 8/1989 | VanderBilt et al. |
| 5,019,311 A | 5/1991 | Koslow |
| 5,024,764 A | 6/1991 | Holler ......................... 210/484 |
| 5,180,630 A | 1/1993 | Giglia |
| 5,393,601 A | 2/1995 | Heinrich et al. ............. 428/287 |
| 5,429,745 A | 7/1995 | Ogata et al. ........... 210/497.01 |
| 5,605,746 A | 2/1997 | Groeger et al. ............. 442/347 |
| 5,665,235 A | 9/1997 | Gildersleeve et al. ....... 210/503 |
| 5,711,878 A | 1/1998 | Ogata et al. ................. 210/490 |
| 5,728,298 A | 3/1998 | Hamlin ........................ 210/491 |
| 5,882,517 A | 3/1999 | Chen et al. .................. 210/496 |
| 5,928,588 A | 7/1999 | Chen et al. .................. 264/113 |

Primary Examiner—Steven P. Griffin
Assistant Examiner—M. Halpern
(74) Attorney, Agent, or Firm—Cummings & Lockwood LLC

(57) ABSTRACT

A process for manufacturing wet-felted and thermally bonded porous structures is provided to produce formed porous media for use in filters with improved filtration performance. The process includes the steps of forming a slurry with a primary media consisting of natural or synthetic fibers, a wet strength agent consisting of fibrillated fibers, and a binding agent; vacuum forming the slurry to produce a formed media; drying the formed media using a gas at a temperature below the melting temperature of the binding agent; bonding the formed media using a gas at a temperature above the melting temperature of the binding agent; and cooling the formed media using a gas at ambient temperature. The process produces a formed porous media with improved bonding which results in improved filtration performance.

30 Claims, 2 Drawing Sheets

PROCESS FOR MANUFACTURING WET-FELTED AND THERMALLY BONDED POROUS STRUCTURES AND POROUS STRUCTURES FORMED BY THE PROCESS

BACKGROUND OF THE INVENTION

1. Field of the Invention

The present invention relates to a process for manufacturing wet-felted and thermally bonded porous structures which can be used as filters. The invention also relates to the fibrous felted porous structure formed by the process.

2. Background of the Related Art

Felted porous structures such as filters are typically manufactured by "accretion." In an accretion process, a homogeneous bath or slurry of the material to be accreted is mixed and a vacuum forming process is used to create a formed media from the materials in the slurry. In one vacuum forming method often used, a perforated mandrel is immersed in the bath or slurry, and a vacuum is pulled on the mandrel causing a layer of material to accrete on the outer surface of the mandrel to create a formed media. The mandrel is withdrawn from the bath or slurry and the formed media is dried. Depending on the intended use, the formed media may be densified or may be cut to a desired shape.

In some prior applications of the accretion method, a slurry is mixed in water with a combination of a fibers and a thermoplastic or thermosetting binding material. Other materials may be added to the slurry to impart desired filtering characteristics into the formed media. Accretion of the material in the slurry may be performed using a vacuum mandrel to create a formed porous media on the mandrel. In some applications, a filter core is placed over the vacuum mandrel and the accretion process creates a formed media covering the filter core.

After the accretion step is complete, the formed media is dried and bonded by heating the formed media to a temperature above the melting or curing temperature of the binding material. This dries the formed media and bonds the primary media and wet strength agent by melting or curing the binding material. As the formed media is cooled, the binding material solidifies and binds the formed media.

While several variations of this process have been described previously, in each case the drying and bonding of the formed media is performed by heating the accreted formed media to a temperature above the melting point of the binding agent in a single step. For example, in U.S. Pat. No. 4,032,457 to Matchett, a multiple phase filter is described which is made by combining fibers with resin binders and active particles to form slurries of varying compositions. The filter described by Matchett is formed by dipping a perforated mandrel is a slurry, drawing a vacuum on the mandrel to accrete material from the slurry on the mandrel, and repeating these steps in successive slurries of varying compositions to form a media with multiple phases. After formation, the multiple phase media is dried and bonded in a single step by heating the formed media to a temperature above the melting temperature of the binder.

In U.S. Pat. No. 4,620,932 to Howery, et al., a one piece filter constructed by saturation of a base matrix material with a hydrophilic terpolymeric material is described. Saturation of the base material is accomplished by spraying, depth coating, or dipping the base matrix in the hydrophilic terpolymer material. The saturated material is then initially dried at a temperature of 160–250 degrees Fahrenheit to remove 40–60 percent of the moisture from the material, with second stage drying performed at a lower temperature of 100–160 degrees Fahrenheit, and final drying occurring in a third stage at 65–90 degrees Fahrenheit. Thus, Howery describes a process in which the material is initially heated to a high temperature, with drying being completed in steps with successively lower temperatures.

Combinations of base fiber materials and binding materials have also been used to produce non-woven fabrics and other materials. For example, U.S. Pat. No. 5,393,601 to Heinrich, et al., describes a non-woven material formed by combining aramid fibers with a melt binder made of thermoplastic aramids The melt binder has a melting point below the melting point of the aramid fibers. The aramid fibers and the melt binder are mixed in water, the aqueous suspension is placed on a sieve tray, the water is separated off, and the remaining fibers are heated to a temperature above the melting temperature of the melt binder to dry and bind the fibers.

In all of these prior methods, the formed media are initially heated to a temperature above the melting temperature of the binder in a single step. Combining drying and bonding in a single step process can sometimes lead to uneven bonding of the fibers in the formed media. Uneven bonding is particularly disadvantageous where the formed media is used as a filtering media, because uneven bonding can reduce filter performance and quality.

Accordingly, the present invention overcomes the drawbacks and disadvantages of the prior art through a novel process for producing wet felted and thermally bonded porous media that results in improved filter quality and performance.

SUMMARY OF THE INVENTION

The present invention provides, in one aspect, an improved process for producing wet-felted and thermally bonded porous media, and, in a second aspect, provides an improved wet-felted and thermally bonded porous media made by the process. The invention comprises a process in which a primary media, a wet strength agent, and a binding agent are combined in a liquid, typically water, to form a slurry. Other materials may be added to the slurry to impart desired characteristics to the porous media. A vacuum forming process is used to accrete the materials in the slurry into a formed media. The formed media is then dried and bonded in a two-step process.

The formed media is first dried a temperature below the melting or curing temperature of the binding agent. The drying may be performed under vacuum to facilitate rapid drying. The drying step is continued for a sufficient time to remove substantially all of the water from the formed media.

After the formed media has been dried, it is bonded by heating the formed media to a temperature above the melting or curing temperature of the binding agent. This second stage of heating may be performed under a vacuum to draw heated gas through the porous media. If a vacuum is used, the vacuum pressure during the bonding step may be different from the vacuum pressure during the drying step. During the second stage of heating, the binding agent melts or cures to bind the formed media. When the bonding step is completed, the formed media is cooled, and the binding agent resolidifies. After cooling, the formed media may be cut into any desired shape or size.

One advantage of the present invention is better control over the bonding step. This results in more even bonding of the formed media, which improves the quality and filtration performance of the formed media over that of media manufactured by the previously known processes.

It will be readily appreciated by those skilled in the art that the characteristics of the formed media can be varied as desired by using different primary media or wet strength agents, or by supplying additional components in the slurry to provide desired characteristics. Other advantages of the present invention will become more readily apparent from the following description of the drawings taken in conjunction with the detailed description of the preferred embodiments.

BRIEF DESCRIPTION OF THE DRAWINGS

So that those having ordinary skill in the art to which the subject invention appertains will more readily understand how to perform the process of the subject invention, reference may be had to the drawings wherein.

DETAILED DESCRIPTION OF THE PREFERRED EMBODIMENTS

The present invention is directed to a novel process for manufacturing fibrous felted porous structures which can be used for filters. The invention is also directed to the fibrous felted porous structures made using the process.

Figure 1:
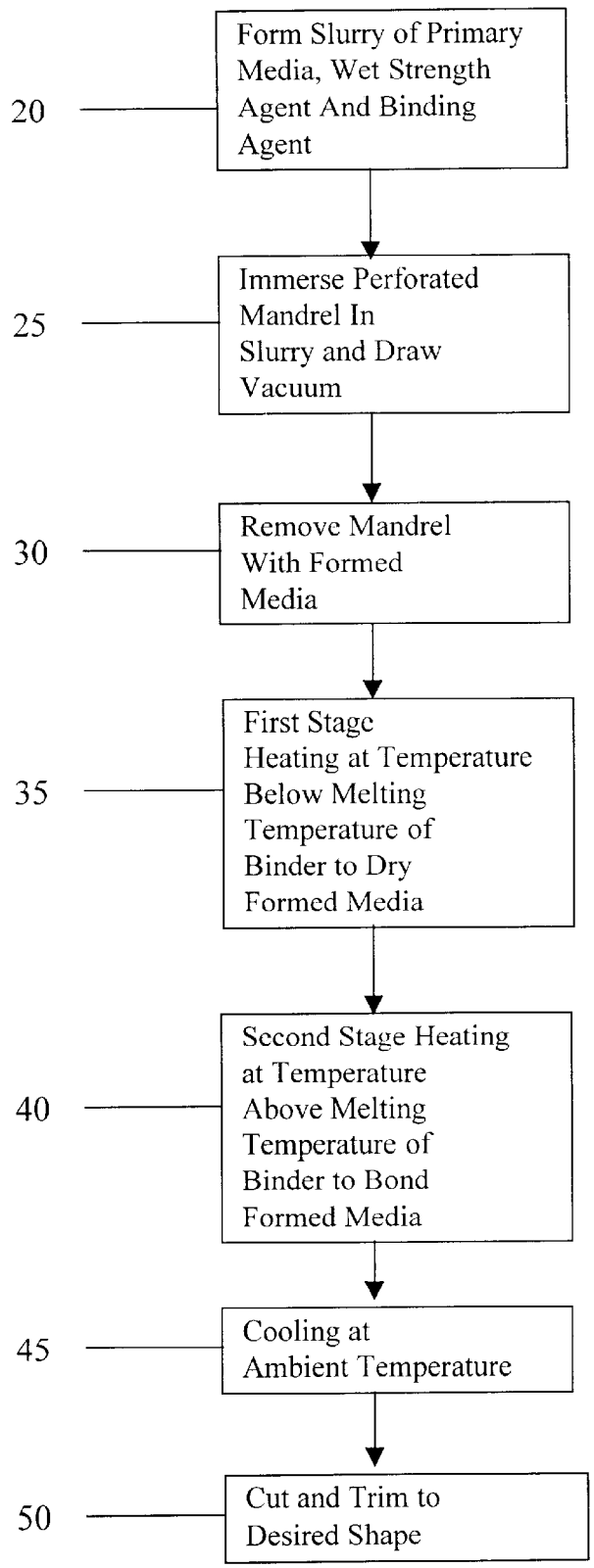
FIG. 1 is a flow diagram depicting the method of formation of wet felted and thermally bonded porous structures in accordance with the present invention.

Referring now to the flow diagram in FIG. 1 wherein like reference numerals identify similar steps of the process for manufacturing the fibrous felted porous structure, in Step 20 of the process a slurry is formed consisting of at least a primary media, a wet strength agent and a binding agent, and typically including water as the medium for the slurry. The primary media may include natural or synthetic fibers, such as for example cellulose, wool, polyolefin, polyester, polypropylene, acrylates, nylon, or any other appropriate material known to one skilled in the art. Mixtures of these fibers may also be used for the primary media. The fibers may be in their ordinary form or they may be fibrillated. Combinations of ordinary and fibrillated fibers may also be used in the primary media.

A wet-felted filter matrix requires a wet strength agent to maintain its shape. In the present invention, fibrillated fibers are used as the wet strength agent. The quantity of fibrillated fiber used to provide wet strength to the filter depends upon the length, diameter, and degree of refinement of the fibrillated fiber. Typically, between about 10% and 25% by weight of a fibrillated fiber is required to provide adequate wet strength. However, the invention is not limited in this regard, and other amounts of fibrillated fibers may be used. Indeed, fibrillated fibers may be used as the major component of the porous structure and function both as the primary media and as the wet strength agent.

The thermoplastic or thermosetting binding material is selected such that it has a lower melting temperature (for a thermoplastic material) or curing temperature (for a thermosetting material) than the melting temperature of the fibers used in the primary media and the wet strength agent. For example, thermoplastic polymeric fibers or powders with a lower melting point than the fibers used in the primary media and the wet strength agent may be used as a binding material. The melting or curing temperature of the binding material is referred to herein and in the claims as the "binding temperature."

A vacuum forming process is used to create a formed media from the materials in the slurry. As shown in Step 25, the vacuum forming process typically used requires immersing a perforated mandrel in the slurry and drawing a vacuum on the mandrel, causing the materials in the slurry to accrete around the mandrel thereby creating a formed media. For manufacturing filters, a filter core consisting of polypropylene, nylon, polycarbonate, polyester, metal or some other appropriate material known to one skilled in the art may be placed over the mandrel prior to placing the mandrel in the slurry. The filter core may be covered by a woven or non-woven liner material, such as polyester, polyolefin, acrylates, cellulosic material, or blends of these materials. The filter core may be covered by wrapping a sheet of liner material on the core, using a pre-cut sleeve, by wet felting a thin layer of fibers over the filter core, or in any other appropriate manner known to one skilled in the art. The materials in the slurry can be accreted over the filter core to create a formed media on the filter core. In Step 30, the mandrel and the formed media are removed from the slurry.

In Step 35, the formed media is dried in a first stage at a temperature below the binding temperature of the binding agent. The media can be dried slowly at room temperature, or the drying can be performed by drawing a heated gas, typically air, through the formed media under a vacuum. Performing this drying step under the highest possible vacuum pressure facilitates rapid drying, thereby allowing increased production. Drying of the formed media continues until substantially all of the water is removed from the formed media.

After drying of the formed media is complete, in Step 40 of the process, second stage heating is performed by heating the formed media to a temperature above the melting temperature for a thermoplastic binding agent or above the curing temperature for a thermosetting binding agent. This temperature is referred to herein and in the claims as the binding temperature. Accordingly, second stage heating of the formed media takes place at a higher temperature than the drying temperature. The second stage heating may be performed by drawing a heated gas, typically air, through the formed media under a vacuum. The vacuum pressure used for second stage heating may be lower than the vacuum pressure used for drying. In the second stage of heating, the binding agent is melted or cured and the binding material bonds the fibrillated fibers in the formed media.

In Step 45, the dried, bonded formed media is cooled, typically by drawing a cool gas, such as ambient air, through the formed media. The formed media can be cooled at room temperature without a vacuum if desired. During the cooling step, the binding agent resolidifies to bind the fibrillated fibers together. The cooled media can then be cut or trimmed to the desired shape as shown in Step 50.

In one embodiment of the invention, about 60% powdered carbon, about 20% polyethylene fiber and about 20% polypropylene fiber are combined and dispersed in about 1% water to form a slurry. In this embodiment of the invention, the powdered carbon may be Calgon Carbon, WPH1000 grade, or a similar material, the polyethylene fiber may be Fybrel E9990 or a similar material, and the polypropylene fiber may be Fybrel Y600 or a similar material. The polyethylene fiber serves as the binder material, and has a melting point of approximately 135 degrees Celsius. The slurry is maintained at a temperature of approximately 40 degrees Celsius. Warm water is used in this embodiment because lowering the viscosity of the water results in a more closely packed formed media. Cooler water can be used to obtain more open porous structures.

Figure 2:
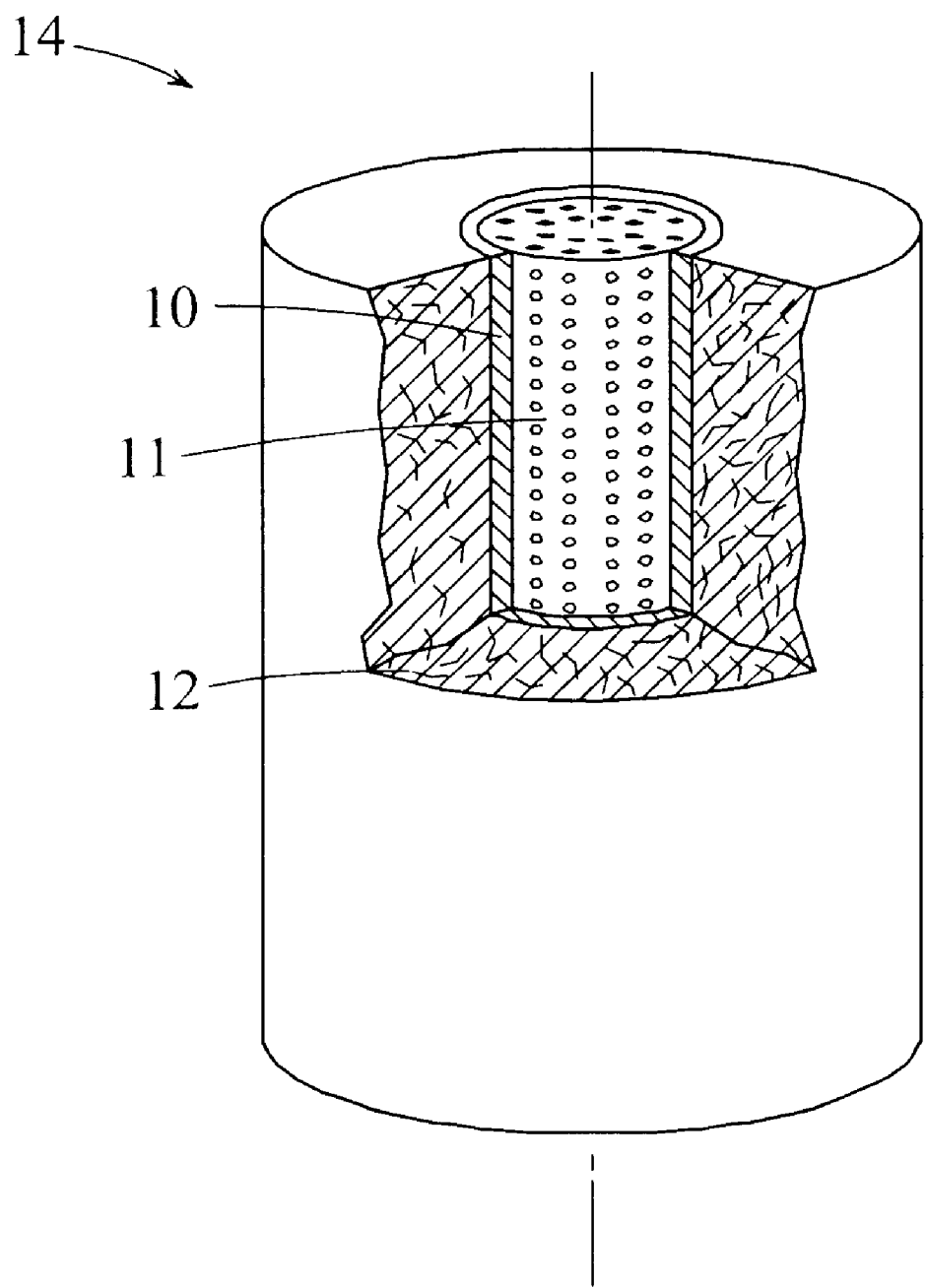
FIG. 2 is a perspective view of a wet felted and thermally bonded porous structure formed on a wrapped polypropylene core, with a portion partially broken away.

Referring now to FIG. 2 wherein like reference numerals identify similar structural elements of a filter assembly made by the method of the present invention, a filter assembly (14) is comprised of a layer of a non-woven liner (10) made of polyester or polypropylene wrapped over a perforated polypropylene core (11). The wrapped polypropylene core is placed over a vacuum mandrel and submerged in the slurry. A vacuum of approximately 20 inches of Hg is drawn, accreting a formed media (12) of carbon and fiber over the non-woven liner (10) wrapped over the polypropylene core (11).

The formed media (12) is dried at a temperature of about 100–120 degrees Celsius, which is below the melting temperature of the polyethylene binder material. Drying is performed at the highest possible vacuum, between about 30–34 inches of water, to facilitate drying without melting the binder material. The process will typically take about 2 hours to dry a formed media of 3 inch outside diameter by 1 inch inside diameter.

The bonding step is performed at 138 degrees Celsius, and under a vacuum of about 6–10 inches of water. The bonding temperature is maintained for between about 5 minutes to about 20 minutes depending upon heating efficiency and the specific heat of the materials used. The formed media (12) should not be heated to too high a temperature and should not be allowed to remain above the melting temperature for too long a time. Excess time or temperature can result in blocking of the pores of the formed media by the melt flow of the polyethylene binder.

After the bonding step is complete, the formed media must be cooled before it can be handled for trimming and cutting. Cooling can be accomplished by drawing ambient air through the formed media for about 15–20 minutes. When the formed media is sufficiently cooled, it may be cut and trimmed as desired.

If desired, the formed media may be densified prior to cooling using a rubber bladder compressed using pressurized air, or by any other densification method known to one skilled in the art.

In other embodiments of the invention, the materials used to form the porous media can be changed to obtain a filter with the desired characteristics. The fibrillated fibers used to manufacture the felted porous structure may be cellulose, wool, polyolefin, polyester, acrylate, aramids, cellulose acetate, or any other material that can be provided in the form of a fibrillated fiber. The binding agent used to manufacture the felted porous structure may be a thermoplastic fiber, a thermoplastic powder, a thermosetting resin or any other material that may be used to thermally bond fibers to form a felted porous structure.

Additional materials may be added to the slurry to impart desirable characteristics to the filter. When added to the slurry, these materials will be incorporated into the accreted porous structure. For example, activated carbon, charcoal, diatomaceous earth, perlite, activated alumina, zeolites, ion-exchange resins, sand, clay, silica, metallic particles or metallic fibers may be added to the slurry to improve filter performance or to impart a desired characteristic to the filter. These examples are not meant to limit in anyway the materials that may be added to the slurry and incorporated into the accreted porous media to impart desirable characteristics to the final product.

As will be apparent to those of ordinary skill in the art based on the teachings herein, numerous changes and modifications may be made to the above-described and other embodiments of this invention without departing from the scope or spirit of the invention as defined by the appended claims. For example, the drying and bonding temperatures, times or pressures may be varied from that described depending upon the materials used. Also, the process can be performed by continuously varying the drying and bonding temperature and pressure, provided that the initial drying of the formed media is first accomplished at a temperature below the melt temperature of the binding material, and the bonding step is then performed at a temperature above the melting point of the binding agent. Accordingly, this detailed description of preferred embodiments is to be taken in an illustrative, as opposed to a limiting, sense.

What is claimed is:

1. A process for making fibrous felted porous structures, comprising the steps of:
   (a) preparing a slurry containing a primary media, a wet strength agent and a binding agent;
   (b) vacuum forming the slurry to produce a formed media;
   (c) drying the formed media at a temperature below the binding temperature of the binding agent, until substantially all water is removed from the formed media;
   (d) bonding the formed media by heating the formed media to a temperature above the binding temperature of the binding agent; and
   (e) cooling said formed media at ambient temperature.

2. The process according to claim 1, wherein the step of drying the formed media at a temperature below the binding temperature of the binding agent comprises drawing a first gas through the formed media, said first gas being at a temperature below the binding temperature of the binding agent, until substantially all water is removed from the formed media;
   wherein the step of bonding the formed media by heating the formed media to a temperature above the binding temperature of the binding agent comprises drawing a second gas through the formed media, said second gas being at a temperature above the binding temperature of the binding agent; and
   wherein the step of cooling said formed media at ambient temperature comprises drawing a third gas through the formed media until cooled, said third gas being at ambient temperature.

3. The process according to claim 2, wherein said first gas, said second gas and said third gas are air.

4. The process according to claim 1, further comprising the step of densifying the formed media by applying pressure to the formed media.

5. The process according to claim 1, wherein the step of preparing a slurry further comprises the steps of:
   (f) supplying in the slurry fibers of at least one of cellulose, wood, polyolefin, polyester, acrylate, arimids, or cellulose acetate; and
   (g) supplying in the slurry at least one of activated carbon, charcoal, diatomaceous earth, perlite, activated alumina, zeolites, ion-exchange resins, sand, clay, silica, metallic particles or metallic fibers.

6. The process according to claim 5, further comprising the step of supplying in the slurry a wet strength agent consisting of fibrillated fibers of at least one of cellulose, wood, polyolefin, polyester, acrylate, arimids or cellulose acetate.

7. The process according to claim 6, further comprising the step of supplying in the slurry a binding agent comprised of thermoplastic fibers.

8. The process according to claim 6, further comprising the step of supplying in the slurry a binding agent comprised of thermoplastic powder.

9. The process according to claim 6, further comprising the step of supplying in the slurry a binding agent comprised of thermosetting resin.

10. The process according to claim 1, wherein the step of vacuum forming further comprises the steps of:
   (f) covering a perforated core with at least one layer of liner material;
   (g) positioning the covered perforated core adjacent to a vacuum mandrel; and
   (h) vacuum forming the slurry onto the covered perforated core to create a formed media.

11. The process according to claim 10, further comprising the step of supplying a non-woven liner material consisting of at least one of polyester, polyolefin, acrylates or cellulose.

12. The process according to claim 10, further comprising the step of supplying a woven liner material consisting of at least one of polyester, polyolefin, acrylates or cellulose.

13. A process for making fibrous felted porous structures, comprising the steps of:
   (a) providing about 60% by weight powdered carbon, about 20% by weight polyethylene fiber, and about 20% by weight polypropylene fiber;
   (b) dispersing the powdered carbon, polyethylene fiber and polypropylene fiber in water at about 40 degrees Celsius to make a slurry of about 1% by weight water;
   (c) wrapping layer of liner material over a perforated core;
   (d) positioning the wrapped perforated core adjacent to a vacuum mandrel;
   (e) applying the said slurry onto the wrapped perforated core under a vacuum of about 270 inches of water to create a formed media;
   (f) drying the formed media by drawing air at a temperature of about 100–120 degrees Celsius through the formed media under a vacuum of about 30–34 inches of water until substantially all water is removed from the formed media;
   (g) bonding the formed media by drawing air at a temperature of about 138 degrees Celsius through the formed media under a vacuum of about 6–10 inches of water for about 20 minutes; and
   (h) cooling the formed media by drawing air at ambient temperature through the formed media by vacuum until cooled.

14. The process according to claim 13, further comprising the step of densifying the formed media by applying pressure to the formed media.

15. The process according to claim 13, further comprising the steps of:
   (i) supplying a non-woven liner material comprised of polyester; and
   (j) supplying a perforated core comprised of polypropylene.

16. A fibrous felted porous structure produced according to the process of claim 1.

17. A fibrous felted porous structure produced according to the process of claim 2.

18. A fibrous felted porous structure produced according to the process of claim 3.

19. A fibrous felted porous structure produced according to the process of claim 4.

20. A fibrous felted porous structure produced according to the process of claim 5.

21. A fibrous felted porous structure produced according to the process of claim 6.

22. A fibrous felted porous structure produced according to the process of claim 7.

23. A fibrous felted porous structure produced according to the process of claim 8.

24. A fibrous felted porous structure produced according to the process of claim 9.

25. A fibrous felted porous structure produced according to the process of claim 10.

26. A fibrous felted porous structure produced according to the process of claim 11.

27. A fibrous felted porous structure produced according to the process of claim 12.

28. A fibrous felted porous structure produced according to the process of claim 13.

29. A fibrous felted porous structure produced according to the process of claim 14.

30. A fibrous felted porous structure produced according to the process of claim 15.

* * * * *